United States Patent [19]
Tagawa

[11] Patent Number: 5,805,644
[45] Date of Patent: Sep. 8, 1998

[54] TRANSMISSION TIMING MEASURING APPARATUS

[75] Inventor: Chihiro Tagawa, Isekar, Japan

[73] Assignee: Anritsu Corporation, Tokyo, Japan

[21] Appl. No.: 591,615

[22] PCT Filed: May 16, 1995

[86] PCT No.: PCT/JP95/00928

§ 371 Date: Jan. 24, 1996

§ 102(e) Date: Jan. 24, 1996

[87] PCT Pub. No.: WO95/33315

PCT Pub. Date: Dec. 7, 1995

[30] Foreign Application Priority Data

May 31, 1994 [JP] Japan .................................... 6-141186

[51] Int. Cl.⁶ .................................................. H04L 7/00
[52] U.S. Cl. .......................... 375/354; 375/372; 370/252; 455/67.1
[58] Field of Search .................................... 375/354, 356, 375/372, 347; 370/252, 519, 324; 455/502, 503, 67.6, 67.1, 561

[56] References Cited

FOREIGN PATENT DOCUMENTS 2-192328 7/1990 Japan .
3-206739 9/1991 Japan .
6-326672 11/1994 Japan .

Primary Examiner—Tesfaldet Bocure
Assistant Examiner—Bryan Webster
Attorney, Agent, or Firm—Frishauf, Holtz, Goodman, Langer & Chick

[57] ABSTRACT

The invention provides a transmission timing measuring apparatus for accurately measuring the transmission timing between channels of a base station and a mobile station in, e.g., a system using a digital time-division modulation scheme in which the base station and the mobile station perform communication using different frequencies. In the transmission timing measuring apparatus of the invention, reference and measurement channel signals having different frequencies are converted into digital data by a signal processing section (20) and are selectively output. A data write section (6) temporarily stores each data in a pre-assigned memory area in a memory section (15) by using an accurate clock. A data read section (7) reads out each data from the memory area on the basis of the reference channel. A transmission timing calculating section (10) calculates the transmission timing from the time difference between symbol sequence data read out from the memory section (15). In this manner, the transmission timing measuring apparatus of the invention can obtain an accurate measurement value of the transmission timing without being influenced by a delay caused by the response characteristics of individual internal circuit elements in a demodulation process.

14 Claims, 12 Drawing Sheets

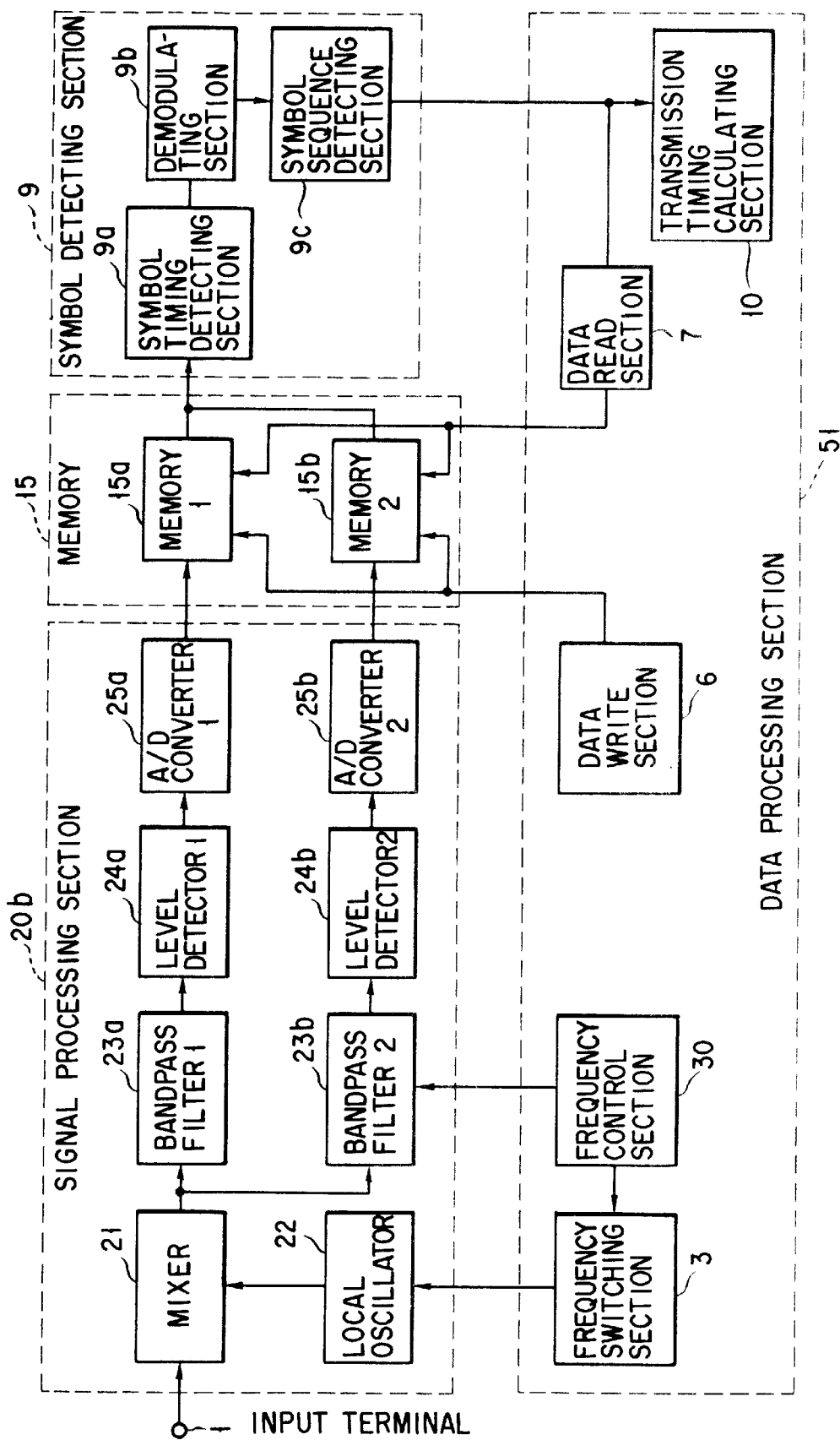
F I G. 2

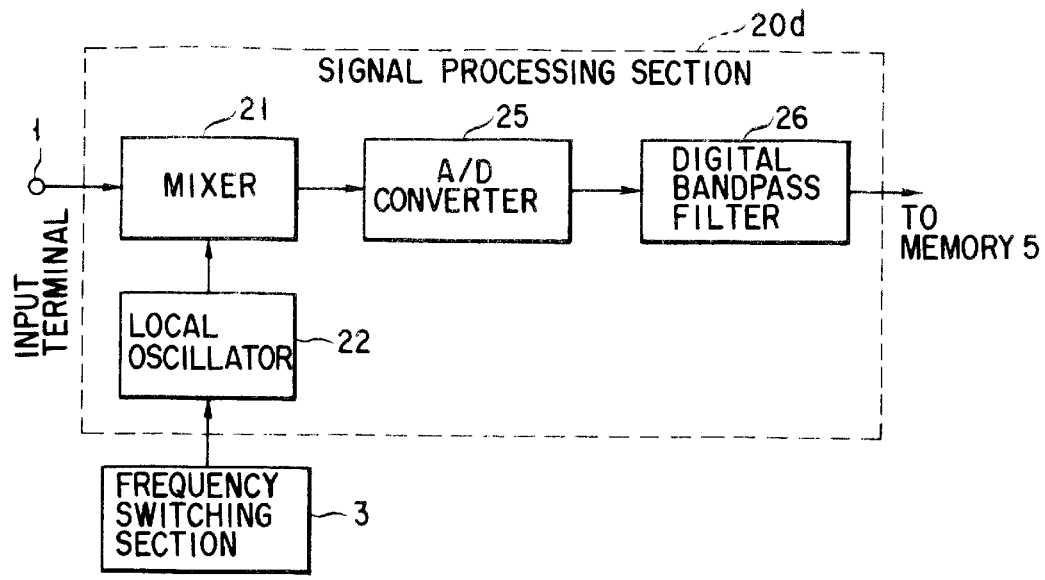
F I G. 4
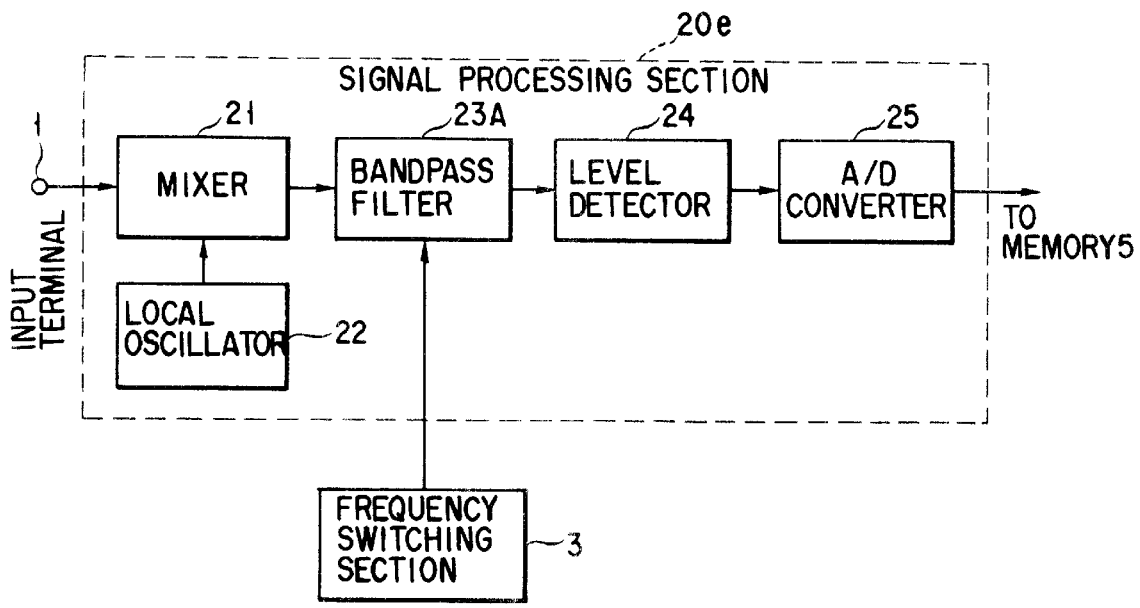
F I G. 5

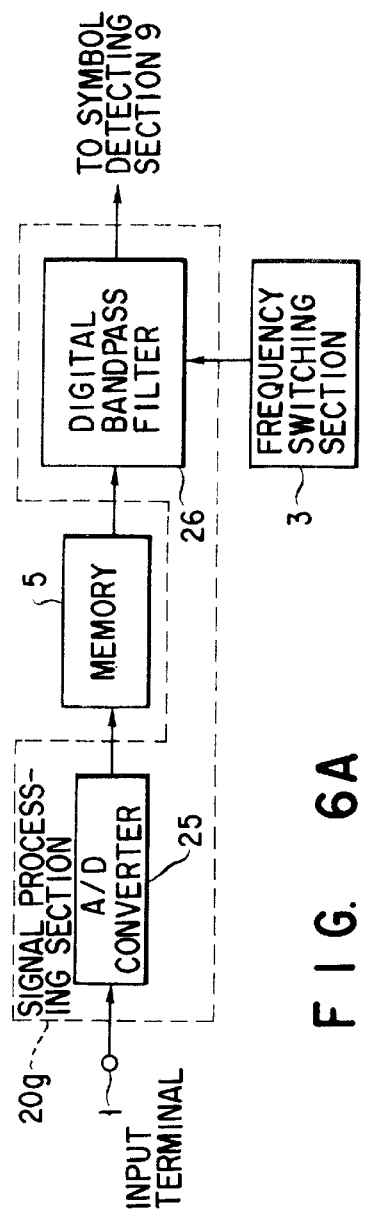
F I G. 6A
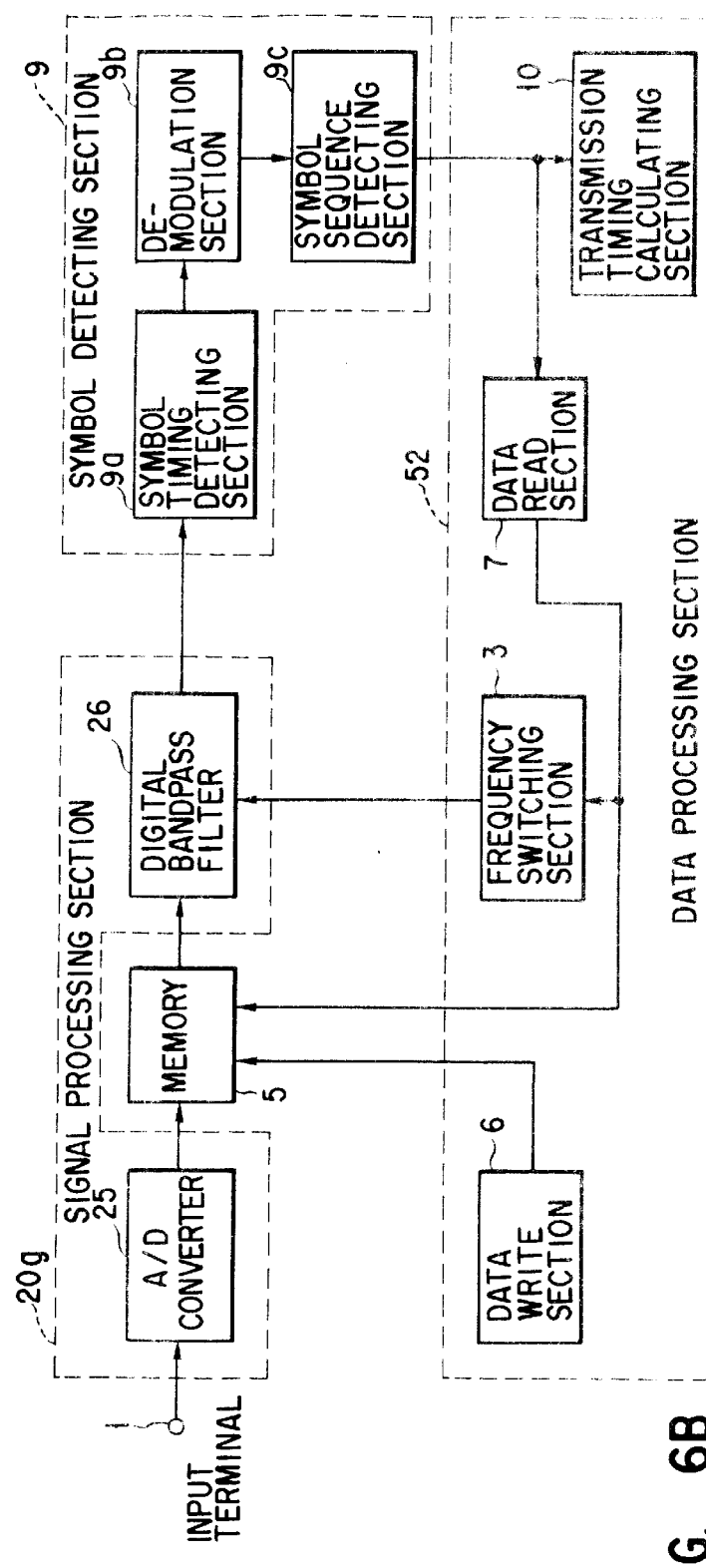
F I G. 6B

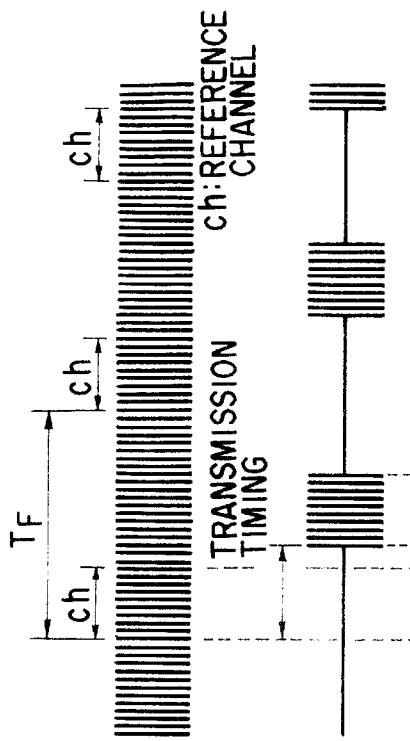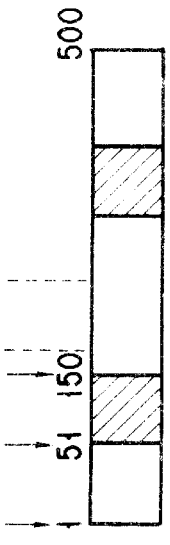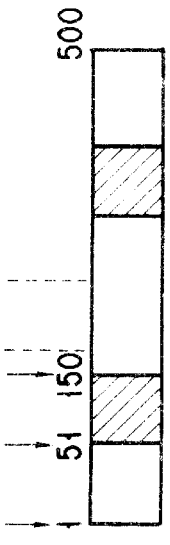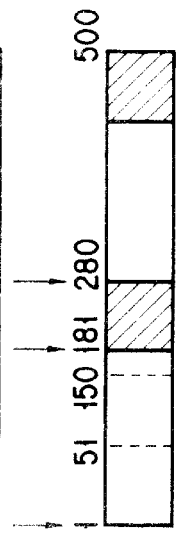
FIG. 11A  REFERENCE CHANNEL SIGNAL C1
FIG. 11B  MEASUREMENT CHANNEL SIGNAL C2
FIG. 11C  MEASUREMENT CHANNEL
FIG. 11D  MEASUREMENT CHANNEL
FIG. 11E  MEMORY WRITE SIGNAL
FIG. 11F  MEMORY AREA OF MEMORY 15a
FIG. 11G  MEMORY AREA OF MEMORY 15b

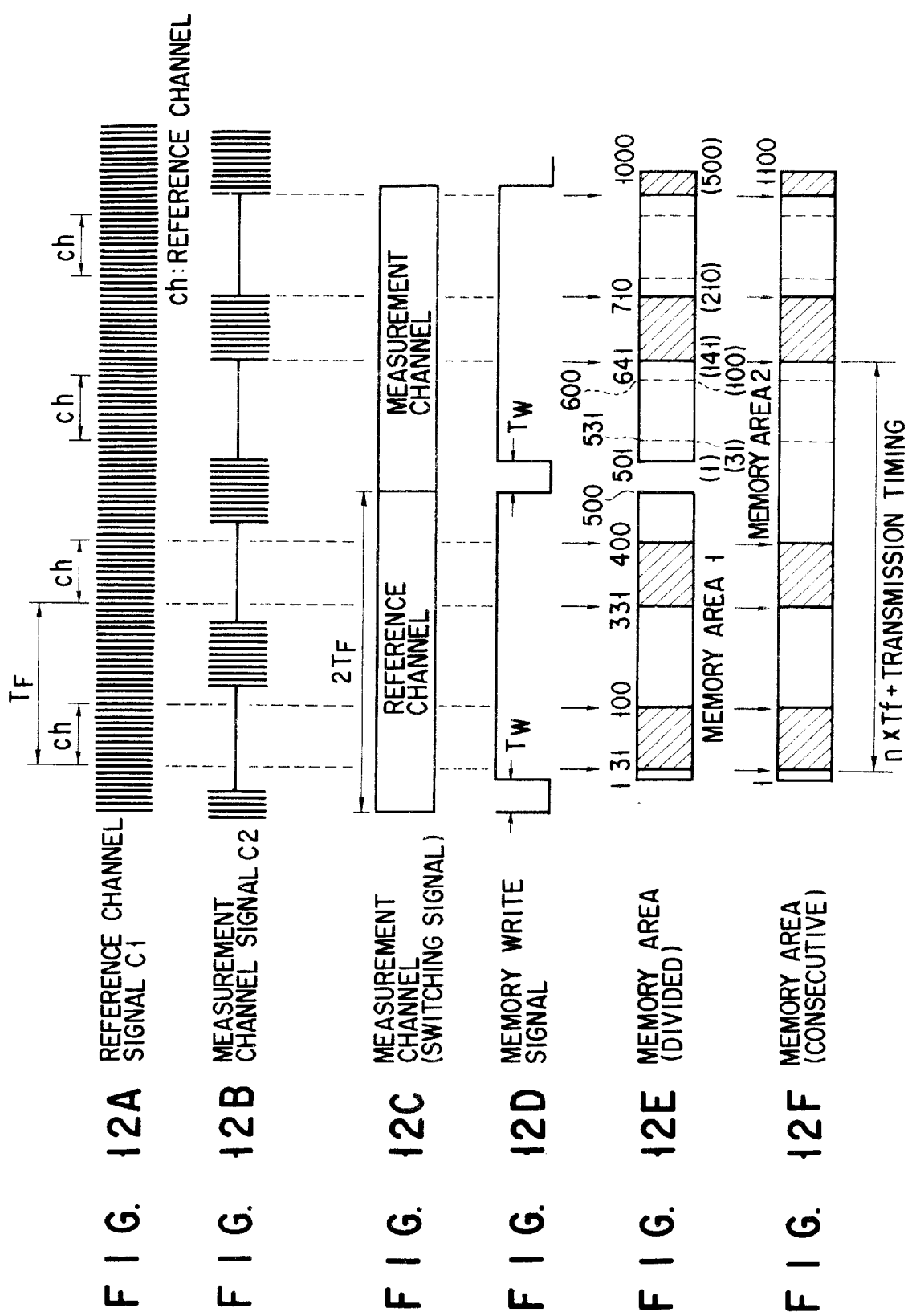

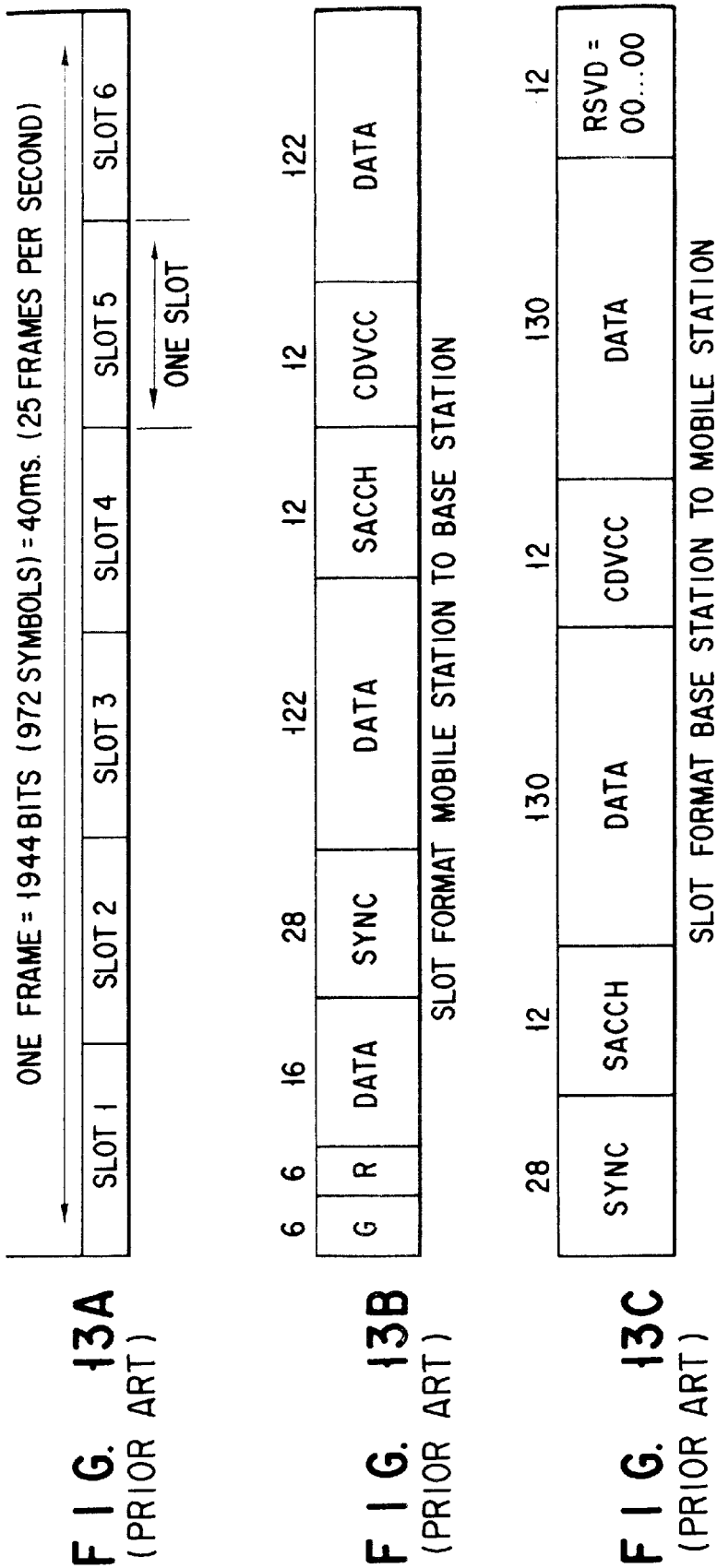

TRANSMISSION TIMING MEASURING APPARATUS

TECHNICAL FIELD

The present invention relates to a transmission timing measuring apparatus for measuring a transmission timing between channels in a digital communication system, e.g., a mobile communication system, in which a base station and a mobile station perform communication using different frequencies.

BACKGROUND ART

In recent years, in mobile communication systems which have rapidly spread, a PDC (Japanese digital mobile phone system), an NADC (U.S. digital mobile phone system), a GSM (European digital mobile phone system), a DMCA (Japanese digital MCA system), and the like are known as digital communication systems using TDM (Time-Division Multiplex) and TDMA (Time-Division Multi-Access).

In such a digital communication system, different transmission (carrier) frequencies are assigned to a base station serving as a fixed station and a mobile station serving as a movable station. Each frequency band is divided into a plurality of time slots, and data communication is performed using a corresponding time slot.

For example, as shown in FIG. 10, center frequencies F1 and F2 are respectively assigned to the base station and the mobile station, and each frequency band is divided into time slots 1 to 6 (indicated by Arabic numerals 1 to 6 in FIG. 10).

Each region defined by such frequency and time slot is called a channel.

FIG. 10 shows a case wherein data communication is performed by using time slot 2 (second channel), as indicated by the hatching.

The base station repeatedly transmits a signal to the mobile station at predetermined time intervals. Upon reception of each signal, the mobile station returns a burst-like signal (to be referred to as a burst signal hereinafter) which is kept ON for a predetermined period of time.

The signal transmitted from the base station is a continuous or burst signal.

Each of the signals transmitted from the base station and the mobile station is a signal obtained as follows. FIGS. 13A to 13C show signal formats based on the above NADC. As shown in FIG. 13A, one frame=1,944 bits (972 symbols) is constituted by slots 1 to 6, and 324-bit (162-symbol) data of each slot is subjected to digital modulation. The resultant data is then superimposed on a predetermined carrier signal, thus obtaining the above signal.

In the signal formats shown in FIGS. 13B and 13C, "G" represents a guard time; "R", a ramp time; "DATA", user information; "RSVD", reserved; "SACCH", a slow associated control channel; "CDVCC", a coded digital verification color code; and "SYNC", synchronization and training (to be referred to as a sync word hereinafter).

Note that each numeral value in the FIGS. 13B and 13C indicates the number of bits.

In such a digital communication system, if the mobile station side cannot transmit a burst signal within a specified channel alone, other channels are adversely affected.

More specifically, according to the digital communication scheme having slots 1 to 3 in FIG. 14, in channels other than a specified channel (to be referred to as a transmission channel hereinafter), signals from other mobile stations and the base station are transmitted. If, therefore, a burst signal deviates from the transmission channel, the signal causes radio interference with the signal in another channel.

FIG. 14 shows a case wherein the transmission timing of channel 2 deviates (broken line solid line) and causes radio interference with channel 1.

When such radio interference occurs, it is difficult for the reception side to receive only the signal in the transmission channel by separating it from the signal in another channel.

In order to prevent such a problem, in each system, as indicated by the hatching in FIG. 10, the transmission start time of a transmission channel (to be referred to as a reference channel), at which a base station (to be referred to as a reference station hereinafter) starts to transmit a carrier signal, is set as a reference time, and a difference To (to be referred to as a transmission timing hereinafter) between the transmission start time of a transmission channel (to be referred to as a measurement channel hereinafter), at which a mobile station (to be referred to as a slave station hereinafter) starts to transmit a carrier signal, and the above-mentioned reference time is specified to fall within a predetermined range.

A transmission timing measuring apparatus is therefore required to support the above digital communication system. This apparatus receives different frequencies from the reference station and the slave station and quantitatively measures the transmission timing To between the carrier signals of a reference channel signal and a measurement channel signal included in the received frequencies.

As such a transmission timing measuring apparatus, a conventional transmission timing measuring apparatus is available. This apparatus measures the time difference between the instant at which the apparatus serves as a reference station itself to start transmitting a signal corresponding to a reference channel, and the instant at which the slave station transmits a signal corresponding to a measurement channel in response to the reference channel signal.

FIG. 8 is a block diagram showing a conventional transmission timing measuring apparatus.

Symbol sequence data which is base-M coded data generated by a data generating section 31 is input to a modulating section 32 to be subjected to digital modulation.

When M=2, the symbol data is equivalent to bit data. A transmission timing calculating section 36 sets the time at which the symbol sequence data is input to the modulating section 32 as reference time for the reference station.

The signal having undergone digital modulation is transmitted as a reference channel carrier signal from a terminal 38. The reference channel carrier signal which is transmitted from the terminal 38 is input to a slave station 37. In accordance with this signal, the slave station 37 transmits a burst signal obtained by modulating the measurement channel symbol sequence data at the specified transmission timing.

The measurement channel burst signal which is transmitted from the slave station 37 is input to a demodulating section 34 through a terminal 39.

The demodulating section 34 demodulates the symbol sequence data from the burst signal and supplies it to a data detecting section 35. The data detecting section 35 detects predetermined position information of the symbol sequence data to set a transmission time for the slave station 37 in the transmission timing calculating section 36.

From the transmission time for the slave station 37, which is set in the transmission timing calculating section 36, and the reference time for the reference station, the transmission timing calculating section 36 performs measurement to check whether the transmission timing for the slave station 37 falls within the predetermined range.

The following problems are posed in the above conventional transmission timing measuring apparatus.

In conventional transmission timing measurement, since the measuring apparatus itself outputs a signal corresponding to a reference channel, the reference time and transmission time can be easily set in the transmission timing calculating section 36 by the data generating section 31 and the data detecting section 35 upon digital processing. The transmission timing calculating section 36 can calculate the transmission timing on the basis of these set values.

However, in order to set a reference time and transmission time for a carrier signal to be actually transmitted, a signal delay in analog processing sections such as filters in the modulating section 32 and the demodulating section 34 must be considered.

The signal delay in such analog processing sections varies among measuring apparatuses because of variations in elements used therein. In addition, the delay in these analog processing sections is larger than that in digital processing.

Such conventional transmission timing measuring apparatuses must therefore measure or estimate these delays which vary in the respective apparatuses.

It is, however, difficult to measure or estimate a signal delay in these analog processing sections, and hence a reference time and transmission time for a carrier signal cannot be set with high precision. Consequently, the conventional transmission timing measuring apparatus cannot measure the transmission timing with high precision.

As described above, the conventional transmission timing measuring apparatus serves as a reference office itself to transmit a reference channel signal, and receives a measurement channel signal transmitted from a slave station in response to the reference channel signal, thereby measuring the transmission timing. With this operation, different signal routes are set in the measuring apparatus depending on signals from the reference station and the slave station. This causes a measurement error.

DISCLOSURE OF INVENTION

It is an object of the present invention to solve the problems in the prior arts described above and provide a transmission timing measuring apparatus which can perform transmission timing measurement using carrier signals with higher precision without considering any frequency signal delays which vary among apparatuses and are caused by different response characteristics of internal circuit elements along different signal routes.

According to an aspect of the present invention, in order to achieve the above object, there is provided a transmission timing measuring apparatus comprising:

a signal processing section for receiving a first channel signal having a predetermined carrier frequency, transmitted from a first station, and containing first symbol sequence data, and a second channel signal having a carrier frequency different from that of the first channel signal, transmitted from a second station in response to the first channel signal, and containing second symbol sequence data, the signal processing section separating the first and second channel signals from each other, converting the signals into first and second digital data, and outputting the data;

a memory section for storing the first and second digital data output from the signal processing section in a state to allow write/read access thereto, data write means for writing the first and second digital data in the memory section to specify a write start time of each data;

data read means for reading out the first and second digital data, which are written in the memory section by the data write means, from the memory section; and transmission timing calculating means for demodulating the first and second digital data read out from the memory section by the data read means, detecting the first and second symbol sequence data, and calculating a transmission timing as a time difference between the first and second channel signals on the basis of the detected first and second symbol sequence data and the write start time, of each of the first and second digital data, which is specified by the data write means.

According to the present invention, for example, a reference channel signal and a measurement channel signal are received through the same terminal, and are converted into digital data by the same means. After the data are stored in the memory, a transmission timing is measured.

More specifically, the signal processing section selects the reference and measurement channel signals having different frequencies, converts the signals into digital data corresponding to the respective channel signal components, and outputs the data.

In this case, a sampling clock required to convert each analog signal into digital data is sufficiently accurate, and is provided by the data write means.

The digital data which correspond to the respective channels and are output from the signal processing section are sequentially stored in pre-assigned memory areas for the respective channels in the memory section by the data write means using the above sampling clock.

At this time, start time Tw is specified and stored, and the time of each data is specified afterward on the basis of the start time Tw as a reference time.

Subsequently, the data read means reads out data from the memory area for the reference channel, and inputs it to the symbol detecting section.

The symbol detecting section detects the time information of a symbol timing from the input digital data, and demodulates the symbol data.

In addition, predetermined symbol sequence data is detected from the demodulated symbol data to determine the symbol position.

The transmission timing calculating means determines a reference time as a reference for a transmission timing by using the time information of the symbol timing obtained from the symbol detecting section, time information obtained from the position of the symbol data, and the data write start time obtained from the data write means.

The data read means then reads out data from the memory area for the measurement channel. The symbol detecting section detects the time information of the symbol timing, and determines the symbol data position. The transmission timing calculating means determines a transmission time as a reference for the transmission time of the measurement channel.

In this case as well, the data write start time information obtained from the data write means is used.

The transmission timing calculating means calculates the transmission timing from the difference between the reference time and the transmission time.

BRIEF DESCRIPTION OF DRAWINGS

FIG. 2 is a block diagram showing a detailed arrangement according to the first embodiment (parallel processing) of the present invention;

FIG. 4 is a block diagram showing a signal processing section according to the fourth embodiment of the present invention;

FIG. 5 is a block diagram showing a signal processing section according to the fifth embodiment (filter switching) of the present invention;

FIGS. 6A and 6B are block diagrams showing the detailed arrangement of a signal processing section according to the sixth embodiment of the present invention;

FIGS. 11A to 11G are timing charts showing the operation of each section in the first embodiment of the present invention;

FIGS. 12A to 12F are timing charts showing the operation of each section in the second embodiment of the present invention;

FIGS. 13A to 13C are views showing signal formats in a digital communication scheme;

BEST MODE OF CARRYING OUT THE INVENTION

Embodiments of the present invention will be described below with reference to the accompanying drawings.
(First Embodiment)
FIG. 1 is a block diagram showing the schematic arrangement of the present invention.

FIG. 2 is a block diagram showing the schematic arrangement of the present invention.

This embodiment will be described below, taking a case wherein a reference channel signal C1, i.e., the continuous signal shown in FIG. 11A, and a measurement channel signal C2, i.e., the burst signal shown in FIG. 11B, are input as measurement signals (to be measured).

Figure 1:
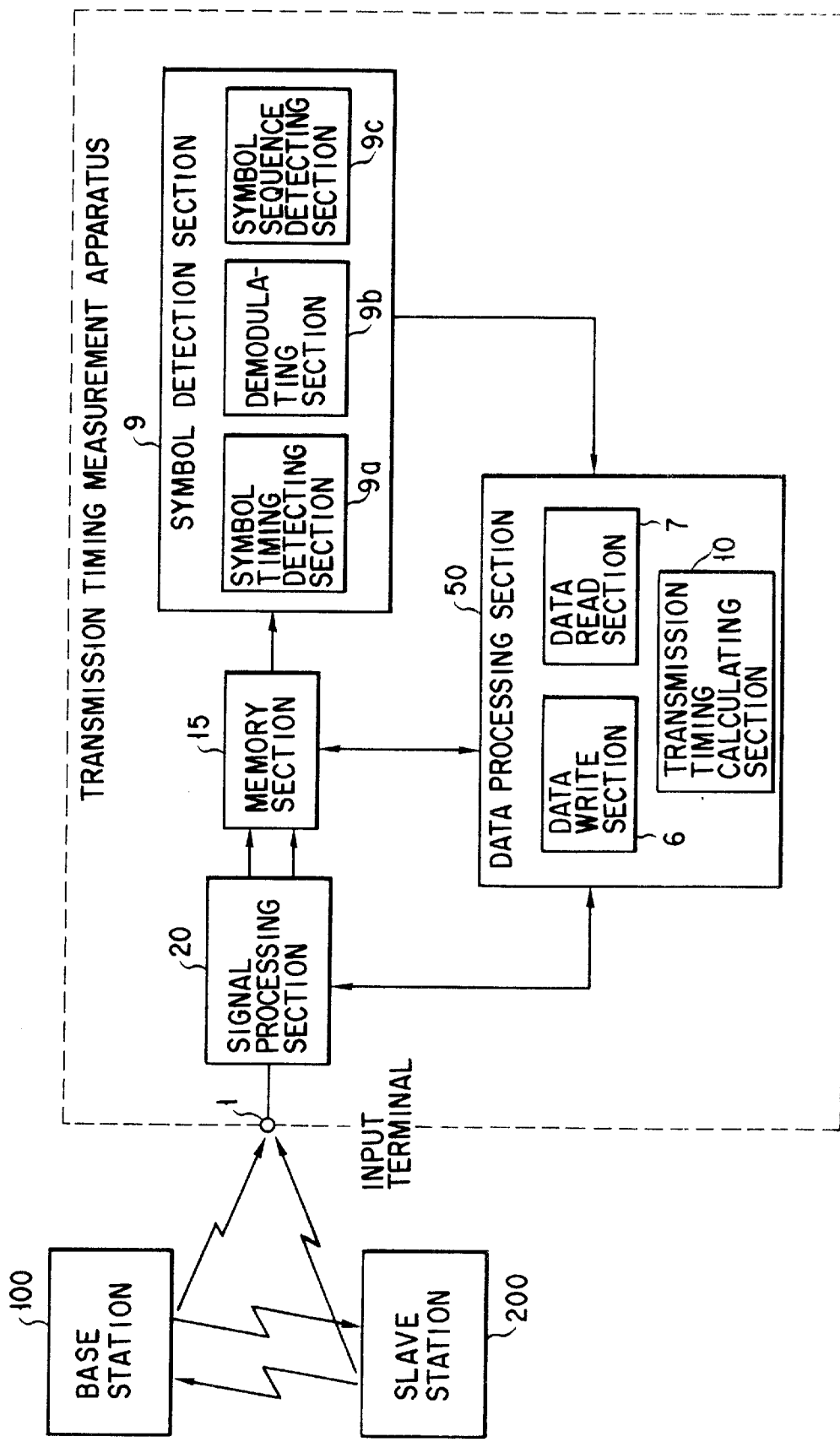
FIG. 1 is a block diagram showing the schematic arrangement of the present invention.

As shown in FIG. 1, a composite (RF) signal obtained by mixing signal components in a reference channel and a measurement channel which are transmitted with the above signal formats and different carrier frequencies from a base station 100 and a slave station 200 is input to a signal processing section 20 through an input terminal 1.

This signal processing section 20, which is shown as a signal processing section 20b in FIG. 2, comprises a mixer 21, a local oscillator 22, bandpass filters and 23a and 23b, level detectors 24a and 24b, and analog/digital (A/D) converters 25a and 25b. The signal processing section 20 selectively separates the signals having the reference and measurement channel carrier frequency components from the composite signal input through the input terminal 1, converts the signals into digital data, and outputs the data to a memory section 15.

In this case, the mixer 21 mixes the measurement signal with a local signal from the local oscillator 22 to convert the signal into an intermediate frequency (IF) signal having a predetermined frequency.

At this time, the pass frequencies of the bandpass filters 23a and 23b are set to the reference and measurement channel frequencies. The bandpass filters 23a and 23b perform band limitation of the IF signal output from the mixer 21 for the respective reference and measurement channels.

The level detectors 24a and 24b are constituted by diodes, capacitors, and the like. The level detectors 24a and 24b respectively receive the IF signals from the bandpass filters 23a and 23b and perform envelope detection of the signals.

The detection signals output from the level detectors 24a and 24b are respectively converted into digital data by the A/D converters 25a and 25b and output to the memory section 15.

That is, the signal processing section 20 (20b) receives a first channel signal having a predetermined carrier frequency and containing first symbol sequence data transmitted from a first station, and a second channel signal having a carrier frequency different from that of the first channel signal and containing second symbol sequence data transmitted from a second station in response to the first channel signal. In addition, the signal processing section 20 separates the first and second channel signals, convert them into first and second digital data, and outputs the data.

A data write section 6 of a data processing section 50 (51) in FIG. 2 sequentially stores corresponding data portions of the digital data output from the A/D converters 25a and 25b in pre-assigned memory areas in memories 15a and 15b in accordance with a memory write signal, as shown in FIG. 11E.

At this time, the data write section 6 writes the data in the memory section 15 by using a clock which is accurate enough for the precision required for a transmission timing to be measured.

In this case, the digital data written in the memory section 15 has a time interval (2TF) in which at least one predetermined symbol sequence data for determining a reference time for the reference channel enters without fail, i.e., a time interval almost twice a repetition period TF of the reference channel (accurately TF+burst signal), as shown in FIG. 11E.

Assume that each of sampling clocks used for A/D conversion in the A/D converters 25a and 25b is identical or equivalent to the clock having sufficient precision and used for a data write operation of the data write section 6.

As shown in FIGS. 11F and 11G, the reference channel data is stored in the memory area (addresses 1 to 500) of the memory 15a, and the measurement channel data is stored in the memory area (addresses 1 to 500) of the memory 15b.

Note that the numbers in FIGS. 11F and 11G represent memory addresses.

As a result, the time corresponding to the reference channel has the same memory address in the memories 15a and 15b, as shown in FIGS. 11F and 11G.

If, for example, the reference channel is stored at addresses 51 to 150 in the memory of the memory 15a, the position of the reference channel in the memory area of the memory 15b also corresponds to addresses 51 to 150.

Note that memory addresses representing the position of the reference channel are not always the same.

In this manner, the data write section 6 writes the first and second digital data output from the signal processing section 20 (20b) in the memories 15a and 15b to specify a write start time.

When the data are completely written in the memories 15a and 15b, a data read section 7 causes a symbol timing detecting section 9a of a symbol detecting section 9 to read out data from the memory area of the memory 15a in which the reference channel data is stored.

The symbol timing detecting section 9a detects the time information of a symbol timing as the timing difference between a clock for symbol sequence data which is base-M coded data and a clock (sampling clock) for the digital data written in the memory 15a from the data read out from the memory 15a at an arbitrary point where the symbol sequence data is present.

A demodulating section 9b demodulates the symbol sequence data by using the time information detected by the symbol timing detecting section 9a by the clock for the symbol sequence data.

A symbol sequence detecting section 9c detects predetermined symbol sequence data such as a sync word from the symbol sequence data demodulated by the demodulating section 9b, and determines the start position of symbol sequence data in a time slot in which the transmission timing is to be detected.

This operation is performed to set the predetermined symbol sequence data detected by the symbol sequence detecting section 9c as a reference for determining the start position of symbol data in the reference channel data.

In this case, since the clock for the digital data written in the memory 15a does not necessarily coincide with the clock for the symbol sequence data, the sampling time of the digital data, i.e., a discrete time represented by an address in the memory 15a does not necessary coincide with the time of a symbol sequence data point.

A transmission timing calculating section 10 therefore determines a reference time for a transmission timing in a time slot to be detected on the basis of the time information of the symbol timing obtained by the symbol timing detecting section 9a, and time information between an arbitrary data point of the symbol sequence data whose position is determined by the symbol sequence detecting section 9c and a symbol data point used by the symbol timing detecting section 9a.

The data read section 7 further reads out data from the memory area of the memory 15b in which the measurement channel data is stored.

Subsequently, similar to the case of the above reference channel, the symbol timing detecting section 9a detects the time information of a symbol timing, and the demodulating section 9b demodulates the symbol sequence data. The symbol sequence detecting section 9c then detects predetermined symbol sequence data such as a sync word.

The transmission timing calculating section 10 determines the transmission start time of the measurement channel on the basis of the time information of a symbol timing at an arbitrary symbol data point, and time information between a symbol data point corresponding to a symbol used to determine the reference time and a symbol data point used to obtain the time information of the symbol timing, and calculates the difference between this transmission start time and the determined reference time as a transmission timing in the time slot to be detected.

Note that measurement signals are not limited to two waves in a reference channel and a measurement channel like those described above. The present invention includes a case wherein a plurality of measurement channels are present with respect to a reference channel, and a case wherein a plurality of reference channels are present.

In these cases, the transmission timing calculating section 10 calculates a transmission timing in each time slot to be detected by using corresponding transmission times and reference times.

Another embodiment of the present invention will be described next with reference to the accompanying drawings.

(Second Embodiment)

Figure 3:
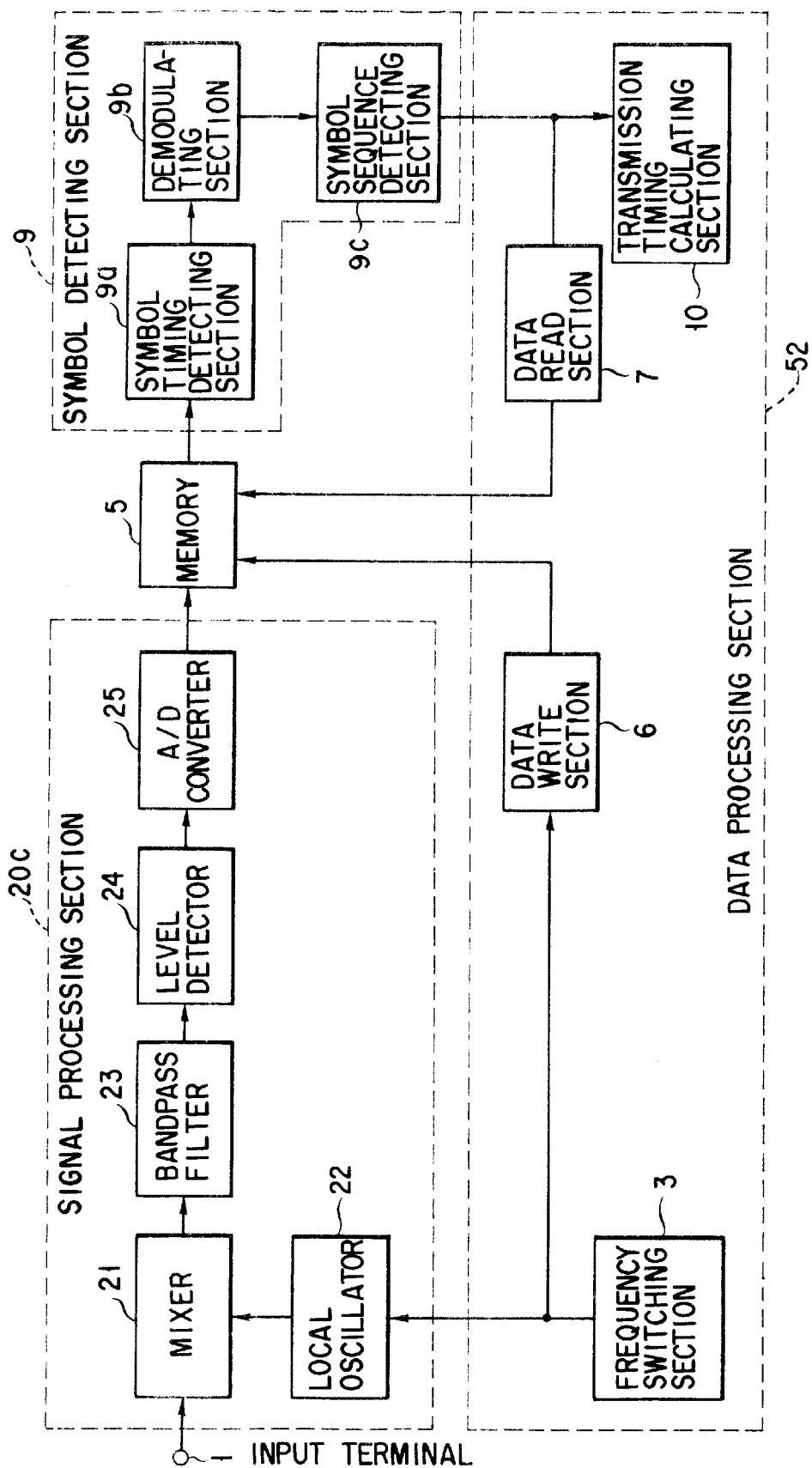
FIG. 3 is a block diagram showing a detailed arrangement according to the second and third embodiments (frequency switching) of the present invention.

FIG. 3 is a block diagram showing the schematic arrangement of a transmission timing measuring apparatus according to the second embodiment of the present invention.

This embodiment will be described below, taking a case wherein a reference channel signal C1, i.e., the continuous signal shown in FIG. 12A, and a measurement channel signal C2, i.e., the burst signal shown in FIG. 12B, are input as measurement signals.

As shown in FIG. 3, a measurement signal, i.e., a composite RF signal obtained by mixing reference and measurement channel signal components having different carrier frequencies and transmitted from first and second stations, as in the first embodiment, is input to a signal processing section 20c through an input terminal 1.

The signal processing section 20c comprises a mixer 21, a local oscillator 22, a bandpass filter 23, a level detector 24, and an A/D converter 25. The signal processing section 20c selects signals of reference and measurement channel carrier frequency components, which are input through the input terminal 1, at predetermined time intervals, converts the signals into digital data, and outputs them to a memory 5.

The mixer 21 mixes each measurement signal with a local signal from the local oscillator 22 to convert the measurement signal into an IF signal having a predetermined frequency.

Local signals from the local oscillator 22 have different frequencies in correspondence with selected channel carrier frequencies. These local signal frequencies are switched by a frequency switching section 3 at predetermined time intervals.

For example, as shown in FIG. 12C, the frequency switching section 3 switches the frequencies of local signals from the local oscillator 22 at time intervals 2TF in each of which at least one predetermined symbol sequence data for determining a reference time for the reference channel enters without fail, i.e., a time interval almost twice a repetition period TF of the reference channel, thereby allowing selection of signals in both the reference and measurement channels.

The bandpass filter 23 performs band limitation of the IF signal output from the mixer 21.

Since the function of the level detector 24 is the same as that in the first embodiment, a description thereof will be omitted.

The A/D converter 25 converts a detection signal output from the level detector 24 into digital data.

The frequency switching section 3 transmits a signal for sequentially switching the local signal frequencies to the local oscillator 22, and also supplies it as a memory write signal to a data write section 6.

As shown in FIG. 12D, the data write section 6 sequentially stores corresponding data portions of the digital data output from the A/D converter 25 in pre-assigned memory areas in the memory 5 in response to the memory write signal after the lapse of a time Tw which is long enough to allow frequency switching of the local oscillator 22.

In this case, the digital data output from the A/D converter 25 has undergone conversion upon reception of an accurate sampling clock which is accurate enough for the precision required for a transmission timing from the data write section 6.

In addition, the data write section 6 specifies the start time at which data are written in pre-assigned memory areas.

The information write start time Tw is required to determine the relationship in time between the pre-assigned memory areas. In this embodiment, this write start time is also determined by using a sampling clock.

That is, in this embodiment as well, by improving the precision of this sampling clock, the precision of the measured value of a transmission timing can be easily improved.

As shown in FIG. 12E, of the digital data written in the memory 5 by the data write section 6, the reference channel data is stored in memory area 1 (addresses 1 to 500), and the measurement channel data is stored in memory area 2 (addresses 501 to 1000).

Note that each number in FIG. 12E represents a memory address, and each number in parentheses represents a relative memory address.

As a result, the time corresponding to the reference channel relatively corresponds to the same memory address in each memory area, as shown in FIG. 12E.

When the data are completely written in the memory 5, a data read section 7 reads out data from the memory are a for the reference channel, and then reads out data from the memory area for the measurement channel. The data read section 7 inputs the respective data to a symbol detecting section 9.

Since the processing after the symbol detecting section 9 is the same as that in the first embodiment, a description thereof will be omitted.

In calculating the transmission timing, a transmission timing calculating section 10 needs to use the information of the data write start time for each channel signal which is obtained from the data write section 6.

(Third Embodiment)

According to the third embodiment, as shown in FIG. 12F, the digital data may be consecutively written in the memory without dividing it into memory areas 1 and 2.

In this case, a data write section 6 may only specify the time at which a reference channel frequency is switched to a measurement channel frequency. In reading out data in a measurement channel, a data read section 7 reads out data from a data position after frequency switching.

With this operation, since the digital data corresponding to the respective channels, which are written in a memory 5, are consecutive data, they need not relatively have the same memory address. Similar to a case wherein the memory is divided, the transmission timing can be calculated by a transmission timing calculating section 10.

In this case, the transmission timing calculating section 10 need not use the information of the data write start time.

When the reference and measurement channel digital data are to be written in the memory, a time corresponding to an integer multiple of a predetermined transmission time interval of the reference channel elapses in real time between the reference time determined for the reference channel and the transmission start time for the measurement channel.

The predetermined transmission time interval of the reference channel is sufficiently accurate as compared with the precision required for measurement of the transmission timing, and the sampling clock used by an A/D converter 25 is sufficiently accurate as compared with the precision required for measurement of the transmission timing. For this reason, an accurate transmission timing can be calculated from a relative time without the predetermined transmission time interval of the reference channel.

(Fourth Embodiment)

The signal processing section 20c is not limited to the circuit shown in FIG. 3. For example, a circuit like the one shown in FIG. 4 as the fourth embodiment may be used.

A measurement signal is converted into an IF signal having a frequency of about 2 MHz by a mixer 21 and a local oscillator 22 so as to be selected by a signal component in each channel and directly converted into digital data by an A/D converter.

This IF signal is converted into digital data by an A/D converter 25 and input to a digital bandpass filter 26. The digital bandpass filter 26 then performs band limitation of the signal, and outputs the resultant signal to a memory 5.

(Fifth Embodiment)

According to the fifth embodiment, the bands of a variable bandpass filter 23A can be switched, as shown in FIG. 5, unlike the embodiment in FIG. 4, in which the frequency switching section 3 switches the frequencies of the local oscillator 22.

(Sixth Embodiment)

The sixth embodiment of the present invention will be described below with reference to the accompanying drawings.

FIGS. 6A and 6B are block diagrams showing the schematic arrangements of part and the whole of a transmission timing measuring apparatus according to the sixth embodiment of the present invention.

In the first and second embodiments described above, the carrier frequency difference between the reference channel and the measurement channel is several MHz or more. In this embodiment, carrier frequencies for both channels can be converted by a general A/D converter at once.

This embodiment will be described below, taking a case wherein the reference channel signal C1, i.e., the continuous signal shown in FIG. 12A, and the measurement channel signal C2, i.e., the burst signal shown in FIG. 12B, are input as measurement signals, as in the second embodiment.

As shown in FIGS. 6A and 6B, a measurement signal, i.e., a composite signal obtained by mixing reference and measurement channel signal components having different frequencies and transmitted from first and second stations as in the above-described case, is directly input to an A/D converter 25 through an input terminal 1 to be converted into digital data.

The signal input to the input terminal 1 may be an RF signal or a signal converted into an IF frequency by a mixer (not shown).

The digital data output from the A/D converter 25 is data obtained by sampling the composite signal, which is obtained by mixing the reference and measurement channel signal components, by using an accurate sampling clock. This data is temporarily stored in a memory 5.

Subsequently, the passband of a digital bandpass filter 26 is set to the reference channel frequency, and the digital data temporarily written in the memory 5 is filtered by the digital bandpass filter 26 to obtain digital data having only the reference channel signal component.

The time information indicating the time at which filter processing is started, e.g., an address in the memory 5, is stored in a data write section 6.

The digital data output from the digital bandpass filter 26 is input to a symbol detecting section 9 and used to determine a reference time.

Since the operation of the symbol detecting section 9 at this time is the same as that in the embodiments described above, a description thereof will be omitted.

Similar to the case of the reference channel, the passband of the digital bandpass filter 26 is set to the measurement channel frequency, and the digital data temporarily written in the memory 5 is filtered by the digital bandpass filter 26 to obtain digital data having only the measurement channel signal component.

In this case as well, the time information indicating the time filter processing is started is stored in the data write section 6.

This measurement channel digital data is also input to the symbol detecting section 9 to be used to determine a transmission start time. Since the operation of the symbol detecting section 9 in this case is also the same as that in the above embodiments, a description thereof will be omitted.

In calculating the transmission timing, a transmission timing calculating section 10 needs to use the information of the processing start time of the digital bandpass filter 26 for each channel signal, which is stored in advance.

If the processing start time for the reference channel coincides with that for the measurement channel, it suffices to only obtain the difference between the obtained reference time and the transmission time.

This is because, in determining the reference time or transmission start time, if the reference position of time corresponds to each processing start time and remains the same, it indicates that each time is based on the same reference position.

In this embodiment, digital data obtained by A/D conversion using the A/D converter having a wide band is directly written in the memory, and frequency switching is performed with respect to digital data read out from the memory. According to this technique, the memory capacity can be reduced to ½ that in the embodiments described above.

(Seventh Embodiment)

Figure 7:
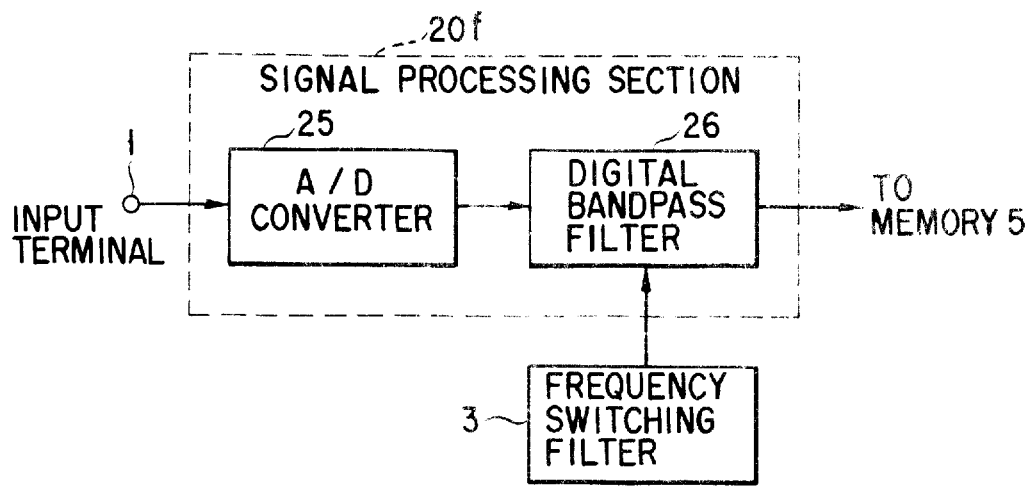
FIG. 7 is a block diagram showing a signal processing section according to the seventh embodiment of the present invention.
Figure 8:
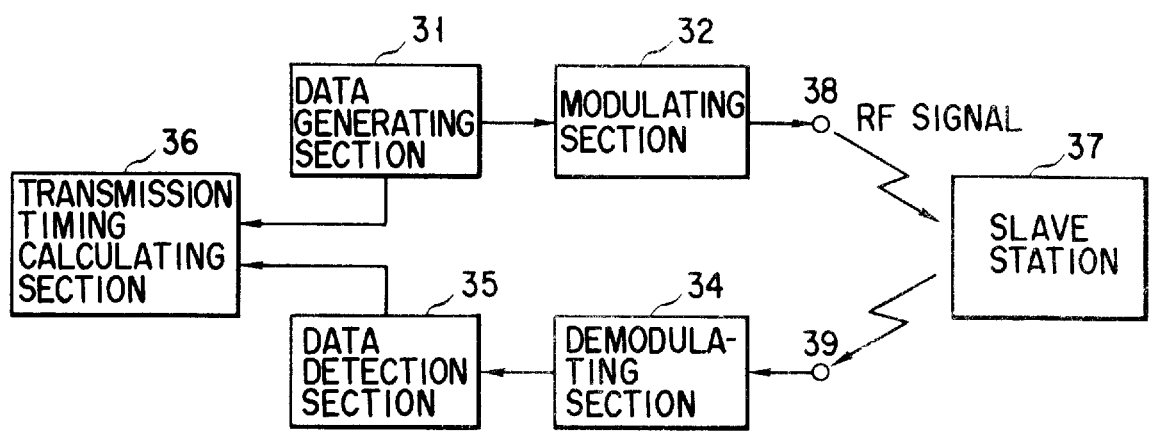
FIG. 8 is a block diagram showing a conventional arrangement.

Even in a case wherein both channel frequencies can be converted by an A/D converter at once as in this embodiment, data filtered by a bandpass filter may be processed to be written in a memory as in the first and second embodiments. FIG. 7 shows an arrangement for such an operation as the seventh embodiment.

In this case as well, a signal to be input to an input terminal 1 may be an RF signal or a signal converted into an IF frequency by a mixer.

As described above, in the present invention, the transmission timing can be calculated by detecting a symbol point using a leading edge of a burst signal and a symbol timing instead of detecting predetermined symbol sequence data after demodulation.

Figure 9:
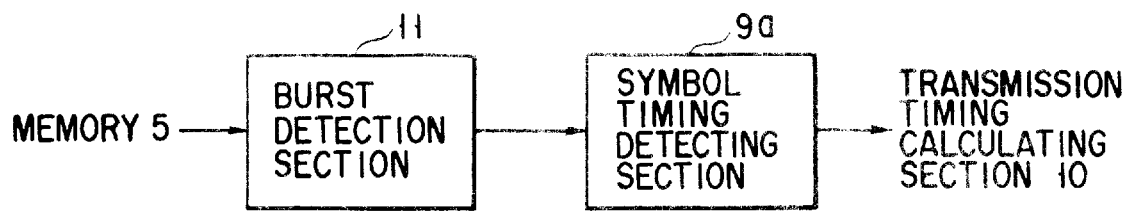
FIG. 9 is a block diagram showing a symbol detecting section according to another embodiment of the present invention.
Figure 10:
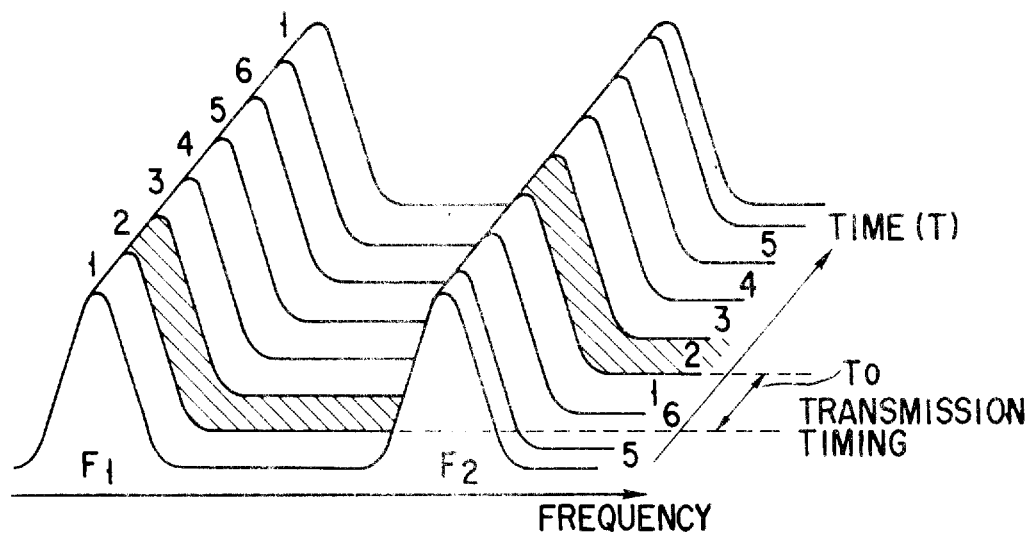
FIG. 10 is a chart showing channel assignment and the transmission timing for a base station and a mobile station according to a digital transmission scheme.
Figure 14:
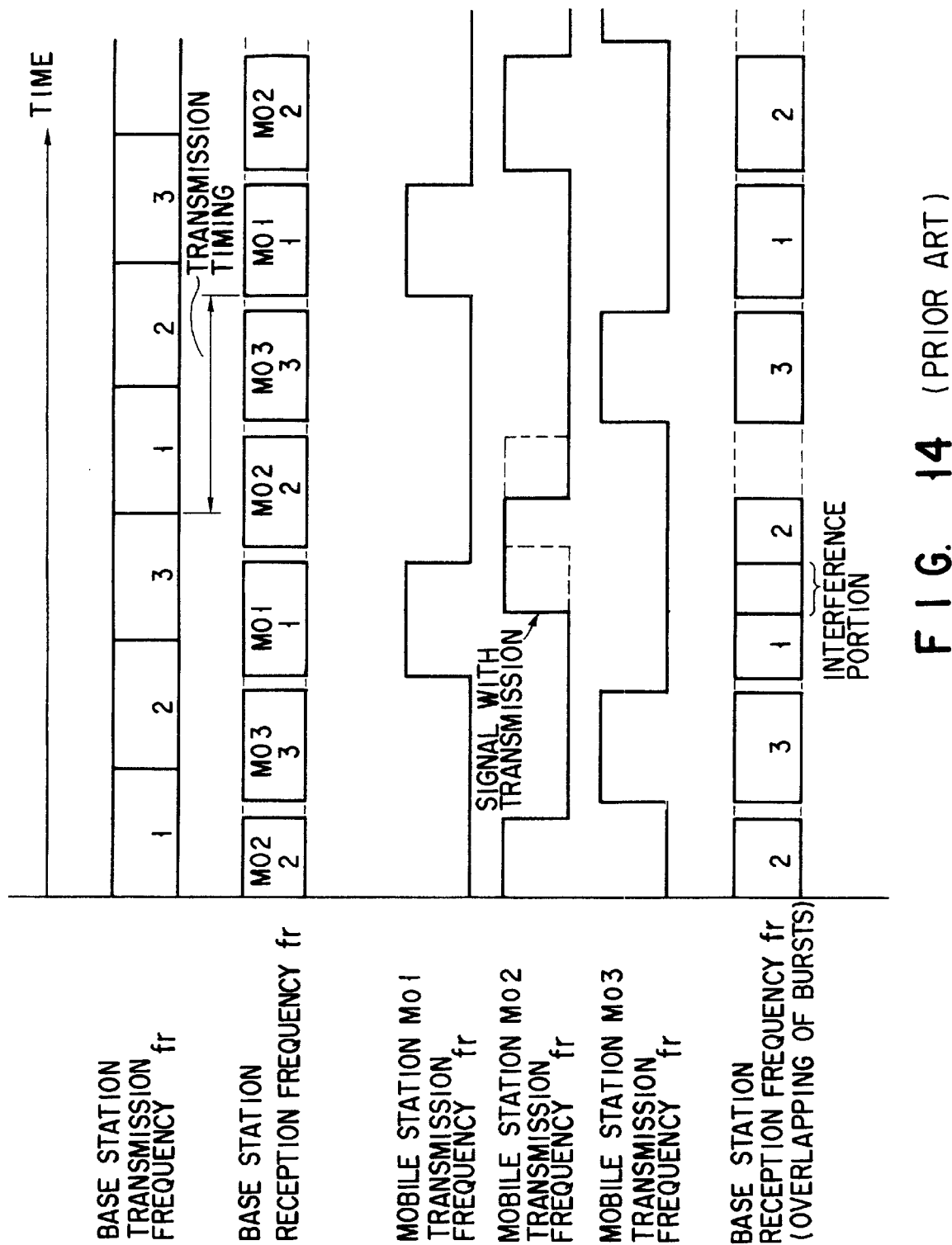
FIG. 14 is a timing chart for explaining a state wherein radio interference is caused when the transmission timing deviates.

In this case, as shown in FIG. 9, a symbol sequence detecting section 11 and a symbol timing detecting section 9a may be used instead of the demodulating section 9b and the symbol sequence detecting section 9c.

Figure 15:
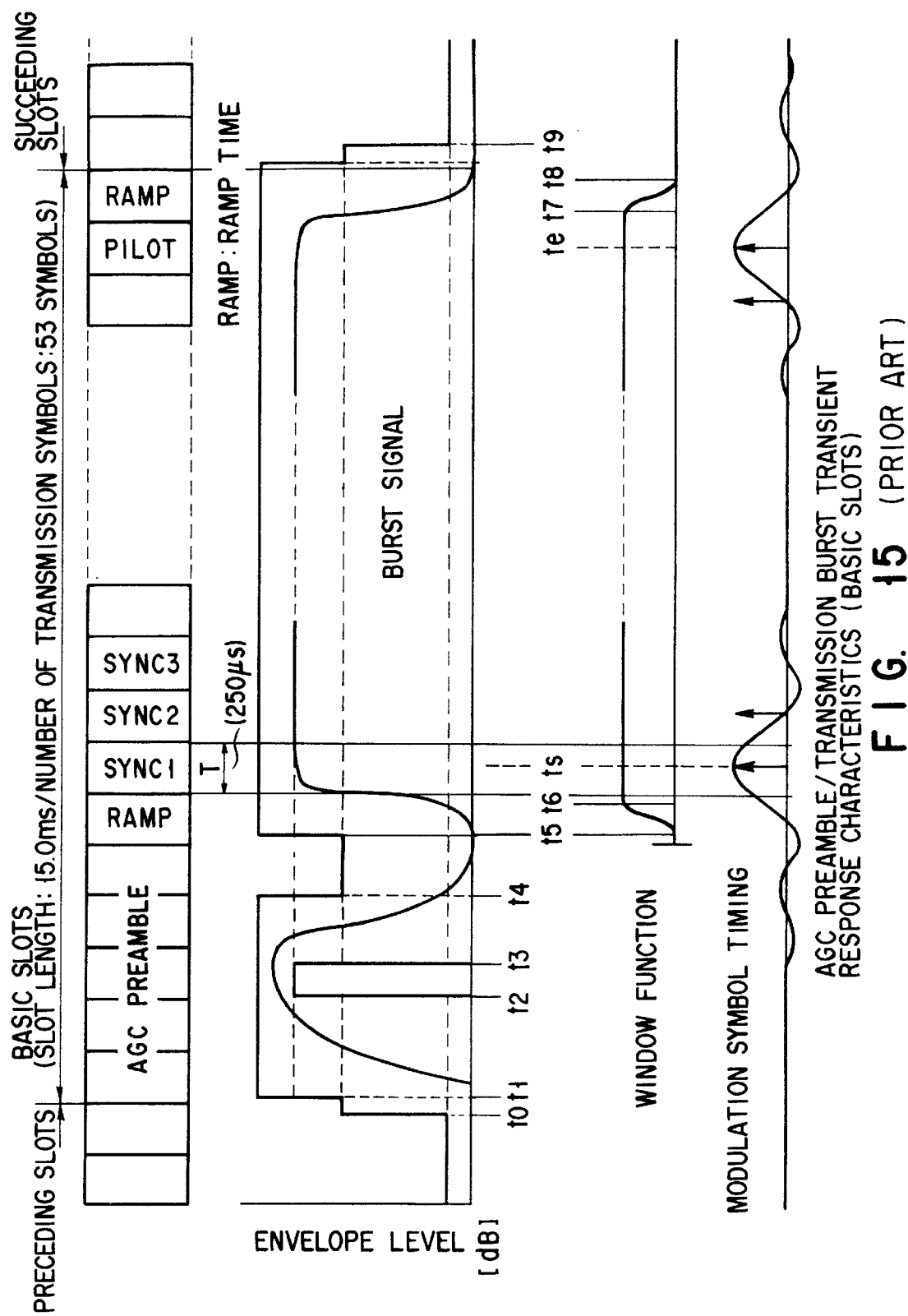
FIG. 15 is a timing chart showing the transmission burst transient response characteristics in a digital communication scheme.

As in the case of DMCA described with reference to FIG. 15, the arrangement of symbol sequence data such as a modulation symbol timing and sync words (SYNC1 to SYNC3) is specified with reference to a leading edge of a burst signal. This embodiment uses such feature.

More specifically, the time information of a leading edge of a burst signal is detected by the symbol sequence detecting section 11 on the basis of address information in a memory 5 in the same manner as described above. In addition, the symbol timing detecting section 9a detects (counts) a symbol timing on the basis of the time information to obtain the degree of delay of the burst waveform. With this operation, the transmission timing can be measured.

In the first embodiment described above, a transmission timing is measured by determining time information corresponding to the start position of symbol data respectively on the basis of burst waveform level information and symbol sequence data in the memory section 15.

As has been described in detail above, therefore, according to the transmission timing measuring apparatus of the present invention, the signal processing section selectively receives reference and measurement channel signals having different frequencies, converts the signals into digital data, and temporarily stores the data in pre-assigned memory areas for the respective channels. Thereafter, data are read out from the respective memory areas to obtain the time information of a symbol timing. In addition, the reference time and transmission time are determined by time information obtained by detecting the position of predetermined symbol sequence data from modulated symbol sequence data, and the time information of the previous symbol timing. With this operation, signals pass through the same route, and hence measurement can be performed regardless of variations in internal circuit elements of different apparatuses. Therefore, measurement can be performed with good reproducibility among apparatuses.

In addition, according to the present invention, since the precision of each time information is dependent on the precision of a sampling clock, more accurate measurement results can be obtained by improving the precision of this sampling clock.

Furthermore, since signals pass through the same route, each time for an RF signal can be easily specified without any consideration of a signal delay produced when the RF signal is converted into digital data. Therefore, the transmission timing for the RF signal in actually required use can be accurately measured.

Industrial Applicability

The present invention can be widely applied to various digital communication systems including mobile communication systems such as mobile phone systems.

I claim:

1. A transmission timing measuring apparatus comprising:

a signal processing section for receiving a first channel signal having a predetermined carrier frequency, transmitted from a first station, and containing first symbol sequence data, and a second channel signal having a carrier frequency different from that of the first channel signal, transmitted from a second station in response to the first channel signal, and containing second symbol sequence data, said signal processing section separating the first and second channel signals from each other, converting the signals into first and second digital data, and outputting the data;

a memory section for storing the first and second digital data output from said signal processing section in a state to allow write/read access thereto;

data write means for writing the first and second digital data in said memory section to specify a write start time of each data;

data read means for reading out the first and second digital data, which are written in said memory section by said data write means, from said memory section; and transmission timing calculating means for demodulating the first and second digital data read out from said memory section by said data read means; detecting the first and second symbol sequence data, and calculating a transmission timing as a time difference between the first and second channel signals on the basis of the detected first and second symbol sequence data and the write start time, of each of the first and second digital data, which is specified by said data write means.

2. A transmission timing measuring apparatus according to claim 1, wherein said data write means stores the first and second digital data such that a time corresponding to the first channel signal relatively has the same memory address in each of the memory areas.

3. A transmission timing measuring apparatus comprising:
a signal processing section for receiving a first channel signal having a predetermined carrier frequency, transmitted from a first station, and containing first symbol sequence data, and a second channel signal having a carrier frequency different from that of the first channel signal, transmitted from a second station in response to the first channel signal, and containing second symbol sequence data, said signal processing section separating the first and second channel signals from each other, converting the signals into first and second digital data, and outputting the data;
first and second memory sections for storing the first and second digital data output from said signal processing section in a state to allow write/read access thereto;
data write means for writing the first and second digital data in said first and second memory sections to specify a write start time of each data;
data read means for reading out the first and second digital data, which are written in said first and second memory sections by said data write means, from said first and second memory sections; and
transmission timing calculating means for demodulating the first and second digital data read out from said first and second memory sections by said data read means, detecting the first and second symbol sequence data, and calculating a transmission timing as a time difference between the first and second channel signals on the basis of the detected first and second symbol sequence data and the write start time, of each of the first and second digital data, which is specified by said data write means.

4. A transmission timing measuring apparatus according to claim 3, wherein said data write means stores the first and second digital data such that a time corresponding to the first channel signal relatively has the same memory address in each of memory areas of said first and second memory sections.

5. A transmission timing measuring apparatus according to claim 3, wherein said signal processing section comprises:
a local oscillator for outputting a local signal having a predetermined frequency;
a mixer for outputting an IF signal having a predetermined frequency by mixing the first and second channel signals with the local signal from said local oscillator;
first and second bandpass filters for band-limiting the IF signal the signal from said mixer to frequency bands corresponding to the first and second channel signals;
first and second level detectors for performing envelope detection of the first and second channel IF signals having passed through said first and second bandpass filters; and
first and second A/D converters for converting detection signals output from said first and second level detector into digital data.

6. A transmission timing measuring apparatus comprising:
a signal processing section for receiving a first channel signal having a predetermined carrier frequency, transmitted from a first station, and containing first symbol sequence data, and a second channel signal saving a carrier frequency different from that of the first channel signal, transmitted from a second station in response to the first channel signal, and containing second symbol sequence data, said signal processing section separating the first and second channel signals from each other, converting the signals into first and second digital data, and outputting the data;
frequency switching means for switching frequency bands of said signal processing section at predetermined time intervals in correspondence with the first and second channel signals to select the first and second channel signal components;
a memory section for storing the first and second digital data output from said signal processing section in a state to allow write/read access thereto;
data write means for writing the first and second digital data in said memory section to specify a write start time of each data in response to switching of the frequency bands of said signal processing section;
data read means for reading out the first and second digital data, which are written in said memory section by said data write means, from said memory section; and
transmission timing calculating means for demodulating the first and second digital data read out from said memory section by said data read means, detecting the first and second symbol sequence data, and calculating a transmission timing as a time difference between the first and second channel signals on the basis of the detected first and second symbol sequence data and the write start time, of each of the first and second digital data, which is specified by said data write means.

7. A transmission timing measuring apparatus according to claim 6, wherein said data write means stores the first and second digital data such that a time corresponding to the first channel signal relatively has the same memory address in each of the memory areas.

8. A transmission timing measuring apparatus according to claim 6, wherein said signal processing section comprises:
a local oscillator for selectively outputting first and second local signals having predetermined frequencies corresponding to the first and second channel signals;
a mixer for outputting an IF signal having a predetermined frequency by mixing the first and second channel signals with the first and second local signals from said local oscillator;
a bandpass filter for performing band limitation of the IF signal from said mixer;
a level detector for performing envelope detection of the IF signal having passed through said bandpass filter; and
an A/D converter for converting a detection signal output from said level detector into digital data.

9. A transmission timing measuring apparatus according to claim 6, wherein said signal processing section comprises:
a local oscillator for selectively outputting first and second local signals having predetermined frequencies corresponding to the first and second channel signals;
a mixer for outputting an IF signal having a predetermined frequency by mixing the first and second channel signals with the first and second local signals from said local oscillator;

an A/D converter for converting the IF signal from said mixer into digital data; and a digital bandpass filter for performing band limitation of the digital data from said A/D converter.

10. A transmission timing measuring apparatus according to claim 6, wherein said signal processing section comprises:

an A/D converter for converting the first and second channel signals into digital data; and a digital bandpass filter for performing band limitation of the digital data from said A/D converter.

11. A transmission timing measuring apparatus according to claim 6, wherein said data write means and said data read means have a function of writing or reading data while specifying a read start or end time to allow a memory location in each memory area of said memory section to directly provide time information corresponding to the first and second channels signals.

12. A transmission timing measuring apparatus comprising:

a signal processing section for receiving a first channel signal having a predetermined carrier frequency, transmitted from a first station, and containing first symbol sequence data, and a second channel signal having a carrier frequency different from that of the first channel signal, transmitted from a second station in response to the first channel signal, and containing second symbol sequence data, said signal processing section separating the first and second channel signals from each other, converting the signals into first and second digital data, and outputting the data;

time information output means for obtaining separation processing start time information indicating a start of separation processing of the first and second channel signals in said signal processing section; and transmission timing calculating means for demodulating the first and second digital data output from said signal processing section, detecting the first and second symbol sequence data, and calculating a transmission timing as a time difference between the first and second channel signals on the basis of the separation processing start time information from said time information output means.

13. A transmission timing measuring apparatus according to claim 12, wherein said signal processing section comprises:

an A/D converter for converting the first and second channel signals into digital data; and a digital bandpass filter for performing band limitation of the digital data from said A/D converter.

14. A transmission timing measuring apparatus according to claim 12, wherein said signal processing section further comprises a memory for temporarily storing digital data from said A/D converter and supplying the data to said digital bandpass filter.

* * * * *

UNITED STATES PATENT AND TRADEMARK OFFICE
CERTIFICATE OF CORRECTION

PATENT NO. : 5,805,644
DATED : September 8, 1998
INVENTOR(S) : TAGAWA, Chihiro

It is certified that error appears in the above-identified patent and that said Letters Patent is hereby corrected as shown below:

On the title page, Item [75] Inventor,

"Isekar" should read- Kanagawa,Japan--.

Signed and Sealed this

Twentieth Day of July, 1999

Attest:

Attesting Officer

Q. TODD DICKINSON

Acting Commissioner of Patents and Trademarks